United States Patent
Vasudevan et al.

(10) Patent No.: US 10,414,928 B2
(45) Date of Patent: Sep. 17, 2019

(54) INK COMPOSITION INCLUDING A MODIFIED POLYMER OR COPOLYMER ADDITIVE

(71) Applicant: Hewlett-Packard Development Company, L.P., Houston, TX (US)

(72) Inventors: Sundar Vasudevan, Corvallis, OR (US); Natalie Harvey, Corvallis, OR (US); Richard J. McManus, Corvallis, OR (US); Vladimir Jakubek, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 5 days.

(21) Appl. No.: 15/543,434

(22) PCT Filed: Jan. 30, 2015

(86) PCT No.: PCT/US2015/013932
§ 371 (c)(1),
(2) Date: Jul. 13, 2017

(87) PCT Pub. No.: WO2016/122648
PCT Pub. Date: Aug. 4, 2016

(65) Prior Publication Data
US 2018/0010003 A1     Jan. 11, 2018

(51) Int. Cl.
| | | |
|---|---|---|
| *B41J 2/175* | (2006.01) | |
| *C08F 2/10* | (2006.01) | |
| *C08F 222/06* | (2006.01) | |
| *C08K 5/1515* | (2006.01) | |
| *C09D 11/106* | (2014.01) | |
| *C09D 11/322* | (2014.01) | |
| *C09D 11/38* | (2014.01) | |
| *C09D 11/30* | (2014.01) | |
| *C08F 210/10* | (2006.01) | |

(52) U.S. Cl.
CPC ......... *C09D 11/106* (2013.01); *B41J 2/17503* (2013.01); *C08F 210/10* (2013.01); *C08F 222/06* (2013.01); *C08K 5/1515* (2013.01); *C09D 11/30* (2013.01); *C09D 11/322* (2013.01); *C09D 11/38* (2013.01); *C08F 2500/09* (2013.01); *C08F 2810/40* (2013.01)

(58) Field of Classification Search
CPC ... B41J 2/17503; C08F 210/10; C08F 222/06; C08F 2500/09; C08F 2810/40; C08K 5/1515; C09D 11/106; C09D 11/30; C09D 11/322; C09D 11/38
See application file for complete search history.

(56) References Cited

U.S. PATENT DOCUMENTS

| | | |
|---|---|---|
| 4,558,095 A | 12/1985 | Barth et al. |
| 5,539,038 A | 7/1996 | Katsen et al. |
| 5,811,481 A | 9/1998 | Boutier et al. |
| 5,883,157 A * | 3/1999 | Yamashita ............. C09D 11/30 523/161 |
| 6,491,377 B1 * | 12/2002 | Cleland ................ B41J 2/04541 347/50 |
| 7,078,464 B2 | 7/2006 | Schmidhauser et al. |
| 8,087,766 B2 | 1/2012 | Barreto et al. |
| 2002/0137818 A1 | 9/2002 | Yu et al. |
| 2005/0027035 A1 | 2/2005 | Wang et al. |
| 2005/0206703 A1 | 9/2005 | Guo et al. |
| 2005/0209363 A1 | 9/2005 | Rehman et al. |
| 2007/0076068 A1 | 4/2007 | Guo et al. |
| 2009/0018258 A1 | 1/2009 | Carroll et al. |
| 2009/0246513 A1 | 10/2009 | Laroche et al. |
| 2013/0095047 A1 * | 4/2013 | Castle ...................... A61K 8/86 424/59 |
| 2013/0237661 A1 | 9/2013 | Brust et al. |
| 2014/0023570 A1 | 1/2014 | Klumperman et al. |

FOREIGN PATENT DOCUMENTS

| | | |
|---|---|---|
| EP | 0889102 | 1/1999 |
| KR | 20090094398 | 9/2009 |
| WO | WO 2013/192268 | 12/2013 |

OTHER PUBLICATIONS

International Search Report and Written Opinion for International Application No. PCTIUS2015/013932 dated Aug. 17, 2015, 10 pages.

* cited by examiner

*Primary Examiner* — Irina S Zemel
*Assistant Examiner* — Jeffrey S Lenihan
(74) *Attorney, Agent, or Firm* — Dierker & Kavanaugh PC (57) ABSTRACT

An ink composition includes water, a co-solvent, a colorant, and a modified polymer or copolymer additive. The modified polymer or copolymer additive is selected from the group consisting of i) a hydrolyzed poly(isobutylene-alt-maleic anhydride), ii) a hydrolyzed poly(maleic anhydride-alt-1-octadecene), and iii) a modified polymer or copolymer. The modified polymer or copolymer includes a repeating unit of a backbone chain, and a long chain pendant group attached to a carbon atom of the repeating unit. In the backbone chain, the long chain pendant group of the repeating unit is separated by fewer than 8 spacer carbon atoms from another long chain pendant group of an adjacent repeating unit.

13 Claims, 2 Drawing Sheets

INK COMPOSITION INCLUDING A MODIFIED POLYMER OR COPOLYMER ADDITIVE

BACKGROUND

Inkjet printing or recording systems are commonly used as an effective way to produce images on a print medium, such as paper. Current inkjet printing technology involves forcing the ink drops through small nozzles by thermal ejection, piezoelectric pressure or oscillation onto the surface of the print medium to produce an image thereon. This technology has become a popular way of recording images on various media surfaces (e.g., paper), for a number of reasons, including, low printer noise, capability of high-speed recording and multi-color recording.

BRIEF DESCRIPTION OF THE DRAWINGS

Features and advantages of examples of the present disclosure will become apparent by reference to the following detailed description and drawings, in which like reference numerals correspond to similar, though perhaps not identical, components.

DETAILED DESCRIPTION

Examples of the ink composition disclosed herein form images with desirable print attributes (e.g., durability) and also exhibit print reliability and improved decap performance. With many inkjet inks, it is difficult to simultaneously achieve these attributes. For example, inks having a relatively high solids content (e.g., polymer/binder and/or other additive loading) for improved durability may exhibit poor print reliability and decap performance, due, for example, to kogation (i.e., the deposit of dried ink components on a heating element of a thermal inkjet printhead). For another example, inks having a lower solids content for improved print reliability and decap performance may result in images with poor optical density and/or durability.

The term "print reliability," as used herein, generally refers to the ability of a print cartridge or pen to recover and successfully print after being stored capped for some extended period of time. During capped storage, the colorant in the ink may settle out of the dispersed state and plug the nozzle(s) of the print cartridge. Also during capped storage, the polymer/binder, alone or in combination with the colorant, may form a plug locally within the nozzle. If nozzles are completely plugged, the print cartridge may be rendered useless. It has been found that blocked nozzles may be skewed towards one end of the print cartridge (e.g., the lower end if the cartridge is stored on an angle/tilt, e.g., 5°). The skewed failure may be due to settling colorant. Capped storage has also been found to lead to random nozzle failure throughout the print cartridge (i.e., nozzle failure is not concentrated to one particular area of the cartridge). Random nozzle failure may be due to locally formed binder or binder and colorant plugs.

The term "decap performance," as referred to herein, means the ability of the inkjet ink to readily eject from the printhead, upon prolonged exposure to air. The decap time is measured as the amount of time that a printhead may be left uncapped before the printer nozzles no longer fire properly, potentially because of clogging, plugging, or retraction of the colorant from the drop forming region of the nozzle/firing chamber. The length of time a thermal inkjet pen can remain unused and uncapped before spitting would be required to form an acceptable quality ink drop is called decap time, or first drop decap time. Another decap metric is the number of spits required to get the pen healthy at a specific time interval. The longest decap time that would give acceptable first drop quality or the fewest number of spits required at any given decap time would be desirable for any given ink.

Upon prolonged exposure to air, water may evaporate from an ink formulation, and the percentage of organic components in the ink may increase. As the ink becomes more enriched in the organic co-solvents and other nonvolatile components, a colorant (e.g., a dispersed pigment) therein which is strongly hydrophilic is pulled back/retracted into the bulk of the aqueous phase. Pigment retraction may be referred to as "pigment ink vehicle separation" (PIVS). In addition, as water evaporates from an ink formulation, a viscous plug may form at the nozzle. A subsequent ink drop would have to be fired through this viscous plug, and as such, the first few drops may not be ejected/ejected appropriately out of the orifice. Depending on the ink, successful ejection may occur after a couple of firing events.

Examples of the ink composition of the present disclosure appear to prevent or reduce formation of this viscous plug (in pigment-based or dye-based inks), control the degree/rate of pigment retraction, and improve decap performance. The ink composition disclosed herein includes a modified polymer or copolymer additive that is capable of orienting itself, for example, during uncapped non-use, at an interface between the air and the ink composition in an orifice of a nozzle, which effectively forms an anti-evaporative layer or monolayer. The anti-evaporative layer may reduce evaporation of the water from the ink composition, and thus may reduce the formation of the viscous plug, reduce pigment retraction, and enhance decap performance.

The modified polymer or copolymer additive disclosed herein is a covalently modified, amphiphilic polymer or copolymer, which includes a hydrophilic portion (i.e., a hydrophile) and a hydrophobic portion (i.e., a hydrophobe). In some examples of the modified copolymer additive, poly(isobutylene-alt-maleic anhydride) or poly(maleic anhydride-alt-1-octadecene) is hydrolyzed. Hydrolysis leads to a covalently attached carboxyl group on the copolymer. In other examples of the modified polymer or copolymer additive, a long chain pendant group is covalently attached, directly or indirectly, to a carbon atom of a repeating unit, and within the backbone chain, the long chain pendant group of one repeating unit is separated by fewer than 8 carbon atoms from another long chain pendant group of an adjacent repeating unit. The covalent bonds between the hydrophile(s) and the carbon atoms of the backbone chain and the hydrophobe(s) and the carbon atoms of the backbone chain are strong interactions that are not susceptible to the solvent(s) (or co-solvent(s)) used in the ink formulation.

This is in contrast to previous ink formulations, which include fatty acid lithium salts to form monolayer(s) having a similar anti-evaporative effect. While fatty acid lithium salts are capable of forming these monolayers by orienting their polar head groups toward the aqueous ink environment and their alkyl chains toward the air, these monolayers rely upon non-covalent interactions. The present inventors have found that these monolayers can be disrupted if the lithium (or other metal) coordinates with the solvent, co-solvent, or other component that is capable of binding lithium and that is used in the ink formulation. The modified polymer or copolymer additives disclosed herein are advantageously capable of forming the anti-evaporative layer/monolayer in the presence or absence of lithium, and without solvent-susceptible attractions and repulsions. This is unlike the fatty acid lithium salts, which would not form a monolayer in the absence of lithium.

The modified polymer or copolymer additives disclosed herein also function as a polymeric binder. As such, examples of the ink composition disclosed herein, including the modified polymer or copolymer additive, form durable prints without including a separate polymeric binder.

As mentioned above, the modified polymer or copolymer additive disclosed herein is selected from three different modified polymeric species, namely a hydrolyzed poly (isobutylene-alt-maleic anhydride), a hydrolyzed poly(maleic anhydride-alt-1-octadecene), and a modified polymer or copolymer including a repeating unit and a long chain pendant group. Within the backbone chain of the modified polymer or copolymer, the long chain pendant groups of adjacent repeating unit are separated by fewer than 8 carbon atoms. Some of these example modified polymer or copolymer additives may advantageously be formed by adding a nucleophile to an electrophilic polymer or copolymer in a single-pot, solvent free reaction. Some other of these example modified polymer or copolymer additives may advantageously be formed by adding an electrophile to a nucleophilic polymer or copolymer in a single-pot, solvent free reaction. Details of each example additive and the method for making the additive will now be described.

Poly(isobutylene-alt-maleic anhydride) (PIAM) has the following structure:

where the * indicates that the unit is repeated throughout the backbone chain. This copolymer may be hydrolyzed with a base, such as potassium hydroxide or sodium hydroxide. The reaction converts the anhydride to the acid (e.g., maleic acid) by nucleophilic addition of a hydroxyl group, and thus introduces carboxyl group(s) to the copolymer backbone chain. The hydrolysis is shown below:

where the * indicates that the unit is repeated throughout the backbone chain n number of times.

To form the hydrolyzed PIAM, the PIAM copolymer may be suspended in excess KOH (e.g., 45%) and heated at about 100° C. for about 12 hours. After this time period, reaction mixture is homogeneous (to the human eye). The reaction mixture may then be acidified to a desirable pH. The acid used may be sulfuric acid, nitric acid, or another suitable acid. In an example, the pH is adjusted to be less than 4. A viscous layer made up of the hydrolyzed copolymer forms, for example, at the bottom of the container in which the reaction is performed. The product may be isolated by decanting the aqueous portion of the mixture. The modified PIAM copolymer additive product may also be dried to remove any remaining aqueous portion of the suspension.

Poly(maleic anhydride-alt-1-octadecene) (PMAO) has the following structure:

where the * indicates that the unit is repeated throughout the backbone chain n number of times. This copolymer has one pendant group, the C16 tail from octadecene. This copolymer may be hydrolyzed with a base, (e.g., KOH, NaOH, etc.) using a similar method previously described for PIAM. The hydrolysis reaction converts the anhydride to the acid (e.g., maleic acid) by nucleophilic addition of a hydroxyl group, and thus introduces carboxyl group(s) to the copolymer backbone chain. The hydrolysis is shown below:

where the * indicates that the unit is repeated throughout the backbone chain n number of times.

The other modified polymers or copolymers may be defined by the repeating unit and the long chain pendant group(s) attached thereto. These other modified polymers or copolymers include a repeating unit of a backbone chain, and a long chain pendant group attached to a carbon atom of the repeating unit. Within the backbone chain, the long chain pendant groups of adjacent repeating units are separated by fewer than 8 carbon atoms.

As used herein, the term "long chain pendant group" refers to a linear chain of atoms that includes at least 10 carbon atoms. As examples, the long chain pendant group may be a 12-18 carbon atom chain hydrophobe attached directly to the backbone carbon or indirectly through a linking atom or group. The long chain pendant group may include any number of carbon atoms, so long as the length does not contribute to interaction between pendant groups that forces the (co)polymer into some unfavorable configuration. In an example, the long chain pendant group may include up to 60 carbon atoms, or more. Some examples of these long chain pendant groups may also include other atoms, such as oxygen. As an example, the long chain pendant group may include the 12-18 carbon atom chain hydrophobe as well as polyoxyethylene group(s) (e.g., 3-25 polyoxyethylene group(s), which includes from 6-50 carbon atoms).

When the long chain pendant group includes polyoxyethylene group(s), the present inventors have found that the ratio of linear atoms in the long chain pendant group to spacer carbon atoms between equivalent chemical sites in the backbone chain should be at least 25:3 in order to obtain improved decap performance. In the backbone chain, equivalent chemical sites refer to an atom or a group of atoms that is located in the same position in each repeating unit along the backbone chain, and that is capable of serving as an attachment point for the long chain pendant groups. It is to be understood that the long chain pendant group(s) may not be attached to the equivalent chemical sites. As examples of equivalent chemical sites, in the following structure, there are two carboxylic functional groups per repeating unit, and the carboxylic functional groups labeled "1" are equivalent chemical sites while the carboxylic functional groups labeled "2" are equivalent chemical sites:

For this example, since the long chain pendant group (i.e., —O(CH$_2$CH$_2$O)$_{3-19}$ CH$_2$CH$_2$OCH$_2$CH$_2$(CH$_2$)$_{9-15}$CH$_3$) includes polyoxyethylene groups, the ratio of linear atoms in the long chain pendant group to spacer carbon atoms between the long chain pendant group of one repeating unit and the long chain pendant group of the next repeating unit is at least 25:3. It has been found that with these particular pendant groups, a smaller ratio of linear atoms in the long chain pendant group to spacer carbon atoms leads to worse decap.

It has also been found that when any of the long chain pendant groups disclosed herein are separated by 8 or more spacer carbon atoms, the spacing between the long chain pendant groups may be too large to obtain improved decap. When directly adjacent long chain pendant groups are separated by 8 or more carbon atoms along the (co)polymer backbone chain, the van der Waals attraction between these groups may not be strong enough to hold the groups next to each other to prevent water vapor loss. It is to be further understood that the long chain pendant groups are not on the same carbon atom of the backbone chain, as this configuration is sterically unfavored. However, the long chain pendant groups may be positioned on carbon atoms of the backbone chain that are next to one another. In these instances, the long chain pendant groups are still separated from one another (i.e., they are not attached to the same carbon atom); however, the number of carbon atoms there between is zero.

In the examples disclosed herein, the pendant phenyl groups, methyl groups, and carboxyl groups (without the long chain pendant group attached thereto) are not considered long chain pendant groups as defined herein.

In an example, the spacing between the long chain pendant groups on the backbone chain may be controlled by controlling the mole ratio of the polymer or copolymer and the long chain pendant group starting materials. The mole ratio may vary, depending upon the polymer or copolymer and the long chain pendant group starting materials that are used. In an example, the mole ratio of the polymer or copolymer to the long chain pendant group starting material ranges from 8:1 to 1:1.2. In other examples, the mole ratio of the polymer or copolymer to the long chain pendant group starting material ranges from 4:1 to 1:1.2.

In another example, the spacing between the long chain pendant groups on the backbone chain may be controlled by starting with monomer(s) (having a suitable chain length) that are appropriately derivatized with the long chain pendant group, and then polymerizing the derivatized monomer(s).

In the examples of the modified polymer or copolymer, the repeating unit may be formed from a monomer or comonomer selected from maleic anhydride, an acrylic monomer or comonomer, a methacrylic monomer or comonomer, an amine monomer or comonomer, a vinyl alcohol monomer or comonomer, an allyl alcohol monomer or comonomer, a hydroxyethyl acrylate monomer or comonomer, a hydroxyethyl methacrylate monomer or comonomer, a styrene maleic anhydride having a 1:1 styrene:maleic anhydride ratio (SMA1000), a styrene maleic anhydride having a 2:1 styrene:maleic anhydride ratio (SMA 2000), and isobutylene-alt-maleic anhydride. An example of the acrylic comonomer includes a comonomer of styrene and acrylic acid; an example of the methacrylic comonomer includes a comonomer of styrene and methacrylic acid; examples of the vinyl alcohol comonomers (to form a poly(vinyl alcohol) copolymer) include vinyl alcohol-co-ethylene or partially hydrolyzed vinyl acetate; an example of the allyl alcohol comonomer (to form an allyl alcohol copolymer) is styrene-co-allyl alcohol; examples of the amine comonomer (to form a polyamine copolymer) include linear ethyleneimine or slightly branched ethyleneimines (e.g., those having primary and/or secondary amines); an example of the hydroxyethylacrylate comonomer is a comonomer of styrene, acrylic acid, and hydroxyethylacrylate; an example of the hydroxyethyl methacrylate comonomer includes a comonomer of styrene, methacrylic acid, and hydroxyethylacrylate. Some of the copolymers that form the backbone chain of the modified copolymers disclosed herein are commercially available. Examples include poly(isobutylene-alt-maleic anhydride) (PIAM) copolymers of different molecular weights, which are available under the trade name ISOBAM® from Kuraray America, Inc. PIAM is also available from Aldrich Chemical Co.

The long chain pendant group that is covalently attached to the repeating unit is generally hydrophobic. However, some examples of the hydrophobic long chain pendant groups may also include hydrophilic section(s). As examples, the long chain pendant group may be formed from starting materials having the general formula R—ZH or R'(CH$_2$)$_y$COY, or from an acid chloride, adipic acid ethyl ester, or elaidic acid ethyl ester. R—ZH may be an aliphatic alcohol, aliphatic amine, a thiol, or a polyoxyethylene vegetable-based ether derived from lauryl, cetyl, stearyl, isostearyl, or oleyl alcohol (sometimes referred to as ethoxylated natural fatty alcohols), where R is the aliphatic chain or the polyoxyethylene vegetable-based ether chain and Z is O, N, or S. R—ZH may also be another ethoxylated natural fatty alcohol, where R is an ethoxylated aliphatic chain and Z is O. For R'(CH$_2$)$_y$COY, R' is CH$_3$ or COOH, y ranges from 8 to 16, and Y is OCH$_3$, OCH$_2$CH$_3$, or Cl. When Y is Cl, R'(CH$_2$)$_y$COY can be considered an acid chloride.

Some specific examples of the aliphatic alcohols that may be used to form the long chain pendant group include dodecanol (i.e., lauryl alcohol), 1-octadecanol (i.e., stearyl alcohol), 1-tetradecanol (i.e., myristyl alcohol), 1-hexadecanol (cetyl alcohol), octadecenol (i.e., oleyl alcohol), etc. Some specific examples of polyoxyethylene vegetable-based ethers (or ethoxylated natural fatty alcohols) derived from lauryl, cetyl, stearyl, isostearyl, or oleyl alcohol that may be used to form the long chain pendant groups include BRIJ™ surfactants (such as BRIJ™ IC20-70, BRIJ™ IC20), which are available from Croda Inc. A specific example of the ethoxylated natural fatty alcohol is BRIJ™ L4-LQ, available from Croda Inc.

When reacted to attach to the repeating unit of the copolymer backbone chain, the repeating unit of the polymer backbone chain, or to monomer(s) that will form the repeating unit, an atom or functional group of the starting material (e.g., R—ZH, R'(CH$_2$)$_y$COY, etc.) may not be present in the final modified polymer or copolymer or monomer.

In addition, the long chain pendant groups that are formed may be directly or indirectly attached to respective carbon atoms of the repeating units. When directly attached, the pendant group is covalently bonded to a carbon atom that makes up part of the backbone chain. When indirectly attached, the pendant group is covalently bonded to a linking group, which is covalently bonded to a carbon atom that makes up part of the backbone chain. An example of the linking groups includes a carbon atom. In some examples, the long chain pendant group includes an oxygen atom or a nitrogen atom that bonds to the carbon atom that is bonded to the carbon atom of the backbone chain.

To form some examples of the modified copolymer, an electrophilic copolymer is reacted with nucleophilic component(s) that will introduce long chain pendant group onto the repeating unit of the backbone chain of the electrophilic copolymer. The reaction may result in the esterification or amidation of the electrophilic copolymer. In an example, the electrophilic copolymer and the corresponding nucleophilic component(s) are combined in a suitable mole ratio that will result in the pendant groups being separated by fewer than 8 carbon atoms in the repeating unit. In an example, the mole ratio of electrophilic groups of the copolymer:nucleophilic component(s) may range from about 8:1 to about 1:1.2. The mole ratio may be varied based upon the components that are used. The combination may be heated for some time period. The heating temperature and time will depend, at least in part, on the electrophilic copolymer and nucleophilic component(s) used. In an example, heating takes place at about 100° C. for 12 hours. After this time, the modified copolymer is allowed to cool. The modified copolymer may be used directly in an ink composition. Modified polymers may be formed in a similar manner.

Of the copolymers disclosed herein, any of the styrene maleic anhydride copolymer having a 1:1 styrene:maleic anhydride ratio (SMA1000), the styrene maleic anhydride copolymer having a 2:1 styrene:maleic anhydride ratio (SMA 2000), the poly(isobutylene-alt-maleic anhydride), the acrylic copolymers, and the methacrylic copolymers may be used as the electrophilic copolymer. The nucleophilic component(s) that may be reacted with these electrophilic copolymers include the aliphatic alcohols, the aliphatic amines, the thiols, the polyoxyethylene vegetable-based ethers derived from lauryl, cetyl, stearyl, isostearyl, or oleyl alcohol, and/or the ethoxylated natural fatty alcohols.

The following are some examples of the modified copolymer that can be formed from the electrophilic copolymer and the nucleophilic component(s). In a first example, styrene maleic anhydride copolymer having a 1:1 styrene: maleic anhydride ratio (SMA1000) is reacted with BRIJ™ IC20-70 in a mole ratio of 1:1.2 to form:

(I)

In modified copolymer I, two repeating units are shown, and the * indicates that these units are repeated throughout the backbone chain n number of times. In modified copolymer I, each repeating unit includes a four carbon chain with the phenyl group (Ph), the —O(CH$_2$CH$_2$O)$_{3-19}$CH$_2$CH$_2$OCH$_2$CH$_2$(CH$_2$)$_{9-15}$CH$_3$ long chain pendant group attached through a carbon atom (having a double bonded oxygen attached thereto), and the carboxyl group. As illustrated, the long chain pendant group of the single repeating unit has both a hydrophilic (polyoxyethylene) and a hydrophobic (hydrocarbon) portion. Since the long chain pendant group(s) i) includes poly(oxyethylene group(s)) and ii) are located at equivalent chemical sites, the ratio of the number of linear atoms in the long chain pendant group to the number of spacer carbon atoms in the backbone is at least 25:3. In modified copolymer I, the number of spacer carbon atoms between equivalent chemical sites is 3, therefore the number of linear atoms in the long chain pendant group is 25 or larger.

In modified copolymer I, the reaction conditions may be controlled so that the long chain pendant groups are attached to the other carboxyl groups. In this example, the repeating unit would include the entire structure that is shown, and long chain pendant groups could be attached so they are be 2 carbon atoms apart or 4 carbon atoms apart.

In a second example, styrene maleic anhydride copolymer having a 1:1 styrene:maleic anhydride ratio (SMA1000) is reacted with an aliphatic alcohol (e.g., dodecanol, tetradecanol, hexadecanol, etc.) or an aliphatic amine (e.g., dodecylamine, hexadecylamine, etc.) in a mole ratio of 1:1.2 to form:

(II)

In modified copolymer II, two repeating units are shown, and the * indicates that these units are repeated throughout the backbone chain n number of times. In modified copolymer II, each repeating unit includes a four carbon chain with the phenyl group (Ph), the —$XCH_2CH_2(CH_2)_{9-15}CH_3$ long chain pendant group attached through a carbon atom (having a double bonded oxygen attached thereto), and the carboxyl group. In modified copolymer II, X is NH or O. In this example, the long chain pendant groups are hydrophobic appendages and the carbons to which they are respectively attached are separated by 3 carbon atoms.

Furthermore, in modified copolymer II, the reaction conditions may be controlled so that the long chain pendant groups are attached to the other carboxyl groups. In this example, the repeating unit would include the entire structure that is shown, and long chain pendant groups may be attached to the other carboxyl groups so they could be 2 carbon atoms apart or 4 carbon atoms apart.

In a third example, poly(isobutylene-alt-maleic anhydride) (PIAM) is reacted with an aliphatic alcohol (e.g., dodecanol, tetradecanol, hexadecanol, etc.) in a mole ratio of 1:1.2 to form:

(III)

In modified copolymer III, two repeating units are shown, and the * indicates that these units are repeated throughout the backbone chain n number of times. In modified copolymer III, each repeating unit includes a four carbon chain with the two methyl groups, the —$XCH_2CH_2(CH_2)_{9-15}CH_3$ long chain pendant group attached through a carbon atom (having a double bonded oxygen attached thereto), and the carboxyl group. In modified copolymer III, X is NH or O. In this example, the long chain pendant groups are hydrophobic appendages and the carbons to which they are respectively attached are separated by 3 spacer carbon atoms.

Furthermore, in modified copolymer III, the reaction conditions may be controlled so that the long chain pendant groups are attached to the other carboxyl groups. In this example, the repeating unit would include the entire structure that is shown, and long chain pendant groups may be attached to the other carboxyl groups so they could be 2 carbon atoms apart or 4 carbon atoms apart.

While several examples have been given, it is to be understood that any of the other electrophilic copolymers and the other nucleophiles may be used. For example, any of the previous examples may be made with styrene maleic anhydride copolymer having a 2:1 styrene:maleic anhydride ratio (SMA2000). In some of these examples, the carbon atoms to which the long chain pendant groups are respectively attached are separated by 6 carbon spacer atoms or fewer.

Instead of electrophilic copolymers, electrophilic polymers may be used. As examples, the repeating unit of the electrophilic polymer (homopolymer) backbone chain may be maleic anhydride, an acrylic monomer, or a methacrylic monomer. In some examples, these monomers may be derivatized with the long chain pendant group, and then polymerized to form the homopolymer or a copolymer.

As an example, a homopolymer or a monomer of maleic anhydride may be hydrolyzed. Hydrolysis generates carboxyl groups on each carbon of the backbone chain. The carboxyl groups may be derivatized with the long chain pendant groups described herein on every carboxyl group of the repeating unit. This example would include two long chain pendant groups separated by fewer than 8 carbon atoms on each of the repeating units, and throughout the backbone chain. Alternatively, one carboxyl group of the repeating unit may be derivatized with the long chain pendant group. In this example, the long chain pendant groups of adjacent repeating units are still separated by fewer than 8 carbon atoms.

In another example, the maleic anhydride monomer is hydrolyzed and one carboxyl group is derivatized with an example of the long chain pendant group, as shown below:

This modified maleic anhydride monomer may be polymerized to form a homopolymer (i.e., modified poly(maleic anhydride). This modified maleic anhydride monomer may also be copolymerized with isobutylene to form PIAM, or copolymerized with octadecene to form PMAO, or copolymerized with styrene to form SMA. The copolymerization reaction to form PIAM may be initiated by the addition of heat and chlorine, and the copolymerization reaction to form PMAO may be initiated by the addition of benzoyl peroxide, and the copolymerization reaction to form SMA may be initiated by the addition of organic peroxides (e.g., benzoyl peroxides).

As still another example, an unhydrolyzed polymaleic anhydride homopolymer may directly be reacted with nucleophiles to tailor the pendant groups on alternate acid groups that are formed. An example reaction scheme is shown below:

In modified polymer IV, two repeating units are shown, and the * indicates that these units are repeated throughout the backbone chain n number of times. In modified polymer IV, each repeating unit includes a two carbon chain, the —OCH$_2$CH$_2$(CH$_2$)$_{9-15}$CH$_3$ long chain pendant group attached through a carbon atom (having a double bonded oxygen attached thereto) and the carboxyl group.

In this example, the long chain pendant groups are hydrophobic appendages and the backbone carbons to which they are respectively attached are separated by 1 spacer carbon atom.

Modified polymer IV may also be formed by hydrolyzing the maleic anhydride monomer, derivatizing one carboxyl group with the long chain pendant group, and then polymerizing the resulting monofunctionalized maleic anhydride. Still further, modified polymer IV may also be formed by reacting the maleic anhydride monomer with an alcohol or amine (suitable for forming the long chain pendant group) that would result in a monofunctionalized maleic acid. The monofunctionalized maleic acid can then be polymerized or copolymerized to form an example of the modified polymer or copolymer additive disclosed herein.

In other examples using electrophilic monomers, long chain pendant groups may be added to acrylic or methacrylic acid monomers. An example reaction scheme for derivatizing acrylic and methacrylic acids is:

where R is CH$_3$ or COOH, R$^1$ is H for acrylic acid or CH$_3$ for methacrylic acid, and n ranges from 8 to 16.

As illustrated, in this example, the carboxyl group may be derivatized with the long chain pendant group described herein. The modified (meth)acrylic acid may be polymerized to form a homopolymer, or copolymerized with styrene and/or (meth)acrylic acid to form different examples of (meth)acrylic copolymers. The copolymerization reaction to form the different examples of (meth)acrylic copolymers may be initiated by the addition benzoyl peroxide.

To form some other examples of the modified polymer or copolymer, a nucleophilic monomer, polymer, or copolymer is reacted with electrophilic component(s) that will introduce the long chain pendant group onto the monomer that will become the repeating unit, or onto the repeating unit of the backbone chain of the nucleophilic polymer or copolymer.

Of the copolymers disclosed herein, any of poly(vinyl alcohol) copolymers, allyl alcohol copolymers, the polyamine copolymers, the hydroxyethyl acrylate copolymers, or the hydroxyethyl methacrylate copolymers may be used as the nucleophilic copolymer. Instead of nucleophilic copolymers, nucleophilic polymers or monomers may be used. As examples of suitable nucleophilic polymers, polyamines, poly(vinyl alcohol), poly(allyl alcohol), poly(hydroxyethyl acrylate), or poly(hydroxyethyl methacrylate) may be used. As examples of suitable nucleophilic monomers, an amine monomer, a vinyl alcohol monomer, an allyl alcohol monomer, a hydroxyethyl acrylate, or a hydroxyethyl methacrylate may be used.

The electrophilic component(s) that may be reacted with these nucleophilic copolymers, polymers, or monomers include the acid chloride, adipic acid ethyl ester, or elaidic acid ethyl ester. These electrophilic component(s) may lead to ester or amide formation as well as introduce a free carboxylic acid, which promotes solubility in an aqueous ink vehicle.

In an example, the nucleophilic copolymer and the corresponding electrophilic component(s) are combined in a suitable mole ratio that will result in the long chain pendant groups being separated by fewer than 8 carbon atoms in the backbone chain. In an example, the mole ratio of nucleophilic groups of the copolymer:electrophilic component(s) may range from about 8:1 to about 1:1.2. The combination may be heated for some time period. The heating temperature and time will depend, at least in part, on the nucleophilic copolymer and electrophilic component(s) used. In an example, heating takes place at about 100° C. for 12 hours. After this time, the modified copolymer is allowed to cool. The modified copolymer may be used directly in an ink composition. Modified polymers may be formed in a similar manner.

The following is an example of the modified copolymer that can be formed from the nucleophilic copolymer and the electrophilic component(s). In this example, poly(styrene-co-allyl alcohol) is reacted with R$^2$(CH$_2$)$_y$COY as shown below:

(V)

In modified copolymer V, two repeating units are included, one with a phenyl group (Ph) and the other with the long chain pendant group (—OCO(CH$_2$)$_n$R). Within the backbone chain of this modified copolymer V, the two repeating units are alternating along the backbone chain, so that adjacent repeating units which include the long chain pendant group are separated by the repeating unit which includes the phenyl group. Even with this additional phenyl-containing repeating unit, the long chain pendant groups of adjacent long chain pendant group-containing repeating units are separated by fewer than 8 carbon atoms along the backbone chain. In modified copolymer V, —OCO(CH$_2$)$_n$R is attached to the carbon atom of the backbone chain through the linking carbon atom. In this reaction scheme, the * indicates that both repeating units are repeated throughout the backbone chain, x is the number of moles of the phenyl-containing repeating unit, y of the number of moles of the long chain pendant group-containing repeating unit, n of the pendant group ranges from 9 to 17, R is CH$_3$ or COOH, and Y is OCH$_3$, OCH$_2$CH$_3$, or Cl. In this example, some of the allylic alcohol functional groups may not completely react. Excess allylic alcohol groups may contribute to the hydrophilicity.

As another example, an allyl alcohol monomer may directly be reacted with an electrophile to derivatize the monomer with the long chain pendant group. An example reaction scheme is shown below:

where scheme R is CH$_3$ or COOH, and n ranges from 8-16. As illustrated, the hydroxyl group may be derivatized with the long chain pendant group described herein. The modified allyl alcohol may be polymerized to form a homopolymer, or copolymerized with styrene to form poly(styrene-co-allyl alcohol). The copolymerization reaction to form poly(styrene-co-allyl alcohol) may be initiated with hydrogen peroxide or di-tert-butyl peroxide.

As still another example, hydroxyethyl acrylate or hydroxyethyl methacrylate nucleophilic monomers may be reacted with an electrophile to derivatize the monomer with the long chain pendant group. An example reaction scheme for derivatizing hydroxyethyl acrylate or hydroxyethyl methacrylate is:

where R is CH$_3$ or COOH, R$^1$ is H for hydroxyethyl acrylate or CH$_3$ for hydroxyethyl methacrylate, and n ranges from 8 to 16. As illustrated, the hydroxyl group may be derivatized with the long chain pendant group described herein. The modified hydroxyethyl acrylate or hydroxyethyl methacrylate may be polymerized to form a homopolymer, or copolymerized with styrene and/or (meth)acrylic acid to form different examples of hydroxyethyl (meth)acrylate copolymers. The copolymerization reaction to form the different examples of hydroxyethyl (meth)acrylate copolymers may be initiated by the addition benzoyl peroxide.

Some examples of the modified polymer or copolymer disclosed herein consist of the backbone chain and the long chain pendant groups separated by fewer than 8 spacer carbon atoms. In other instances, other pendant groups may be attached directly or indirectly to the backbone chain. Some examples of other pendant groups have been shown, including phenyl groups, methyl groups, and carboxylic groups. In an example, still another pendant group may be attached to still another carbon atom, and this other carbon atom may be at least 7 carbon atoms away from the carbon atom to which the long chain pendant group is attached.

An example of these other pendant groups may include those pendant groups that may improve the water solubility of the modified polymer or copolymer. Examples of these pendant groups are water solubilizing groups, such as poly(ethylene glycol) or poly(propylene glycol), which are capped on one end and have an alcohol or an amine (to react with the backbone chain) on the other end. An example of the water solubilizing group is poly(ethylene glycol) methyl ether having a weight average molecular weight ranging from about 350 to about 2,000. When included, the water solubilizing groups may be attached to other carbon atoms of the backbone chain, and may or may not be uniformly spaced between the long chain pendant groups. It is to be understood that the introduction of the water solubilizing groups (or any other additional pendant group) does not affect the carbon spacing of fewer than 8 spacer carbon atoms between the long chain pendant groups.

Any examples of the modified polymer or copolymer additive disclosed herein may be incorporated into an ink composition. In an example, the ink composition includes from about 1 wt % to about 2 wt % of the modified polymer or copolymer additive, where the wt % is based upon the total wt % of the ink composition.

The ink composition also includes water (as the main solvent), a co-solvent, and a colorant. In some instances, the ink composition consists of these components. In other instances, the ink composition may also include a surfactant, a biocide, and a pH modifier.

As mentioned above, the co-solvent is not particularly limited, in part because the modified polymer or copolymer additive is based upon covalent interactions and thus is not as susceptible to the solvent as, for example, a monolayer that is based on electrostatic and van der Waals attractions and repulsions. As examples, the co-solvent may be 2-pyrrolidinone; sulfolane; diethyleneglycol dimethyl ether; 1-(2-hydroxyethyl)-2-pyrrolidinone (HE2P); diethyleneglycol; triethyleneglycol; tetraethylene glycol; tripropylene glycol; 1-(2-hydroxyethyl)-2-imidazolidinone; di-(2-hydroxyethyl)-5,5-dimethylhydantoin (commercially available as DANTOCOL® DHE from Lonza, Inc., Allendale, N.J.); triethyleneglycol monoethyl ether; tetraglyme; glycerol polyoxyethyl ethers; 2-methyl-1,3-propanediol; 2-ethyl-2-(hydroxymethyl)-1,3-propanediol (EHPD) (also known as trimethylolpropane); glycerol; dipropyleneglycol; 3-methyl-1,3-butanediol; 3-methyl-1,5-pentanediol; 1,6-hexanediol; 1,5-pentanediol; or combinations thereof.

The total amount of the co-solvent(s) present in the ink composition ranges from about 10 wt % to about 30 wt %. Whether a single co-solvent or a combination of two or more co-solvents is included, the total co-solvent amount is within the provided range.

The colorant may be any of self-dispersed pigments, polymer dispersed pigments, dyes, and combinations thereof.

Carbon blacks may be used as the colorant in examples of the present ink composition. For example, carbon blacks may be used that are of the lamp black, furnace black or gas black type. These carbon blacks may be made water dispersive: through oxidation, either through the carbon black process or through post carbon black manufacturing treatment (e.g., by ozonation); by reaction of the carbon black surface with either small molecule, oligomeric or polymeric materials that are water soluble or dispersive in nature (e.g., p-aminobenzoic acid, acrylic based oligomers or polymers made of monomers such as acrylic or methacrylic acid and esters thereof, and/or polyurethane oligomers or polymers). These carbon blacks may also be made dispersive in water through adsorption of oligomers or polymers of the previously mentioned acrylic, methacrylic, or polyurethane compositions. Carbon blacks can be further made dispersive through encapsulation of the pigment with a latex polymer composed of, e.g., acrylic acid, acrylic esters, methacrylic acid, methacrylic esters, styrene or vinyl acetate. These materials can be made dispersive through the inclusion of various functional groups (such as carboxylates, sulfonates, phosphates or ethylene oxide derivatives) within the polymer.

Some suitable self-dispersed carbon blacks, as well as polymer dispersed pigments are commercially available from E.I. du Pont de Nemours and Co. (Wilmington, Del.), Sensient Technologies Corporation (Milwaukee, Wis.), and Cabot Corporation (Boston, Mass.).

Other pigments with no limitation on color or chemical composition can be used, some examples of which include PY74, PY155, PY128, PY185, PR122, PR254, PR178, PV19, PB15:2, PB15:3, and PB15:4. These colorants can also be made dispersive in water by various means such as small molecule, oligomeric or polymeric attachment, through adsorption of oligomeric or polymeric materials, or through encapsulation (e.g., as described for carbon black).

Any suitable dyes may be used in examples of the present ink composition.

In the examples disclosed herein, the colorant may be present in an amount ranging from about 2 wt % to about 7 wt % of the total wt % of the ink composition. In another example, the colorant may be present in an amount ranging from about 4 wt % to about 4.5 wt % of the total wt % of the ink composition.

As mentioned above, the ink composition may also include the surfactant, the biocide, and the pH modifier.

In an example, the surfactant is a non-ionic surfactant. When the non-ionic surfactant is utilized, a suitable amount of the non-ionic surfactant may range from about 0.1 wt % to about 2 wt % of the total wt % of the ink composition. Examples of suitable non-ionic surfactants include those based upon acetylenic diol chemistry (e.g., SURFYNOL® SE-F, SURFYNOL® 104, SURFYNOL® 420, SURFYNOL® 440, SURFYNOL® 465, and SURFYNOL® 485, available from Air Products and Chemicals, Inc., Allentown, Pa.) and secondary alcohol ethoxylates (e.g., TERGITOL™ 15-S-7 and TERGITOL™ 15-S-9 available from The Dow Chemical Co., Midland, Mich.). Other examples include N-alkyl pyrrolidones, such as SURFADONE® LP-100, or siloxane surfactants such as SILWET® HS-312.

When a biocide is utilized, a suitable amount of the biocide may range from about 0.05 wt % to about 0.5 wt % of the total wt % of the ink composition. It is to be understood that the upper limit for the biocide(s) may depend upon the type of biocide and its toxicological effect and/or regulatory requirements. Suitable biocides include, for example, PROXEL™ GXL, KORDEK™ MLX (The Dow Chemical Co.), BIOBAN™ CS-1246 (The Dow Chemical Co.), and/or ACTICIDE® B20 and/or M20 (Thor GmbH).

The pH of examples of the ink composition generally ranges from about 7 to about 11. It may be desirable that the ink composition have a basic pH, ranging anywhere from greater than 7 to 12. When the initial pH of the resulting ink composition is acidic, neutral, or near-neutral basic (e.g., having a pH ranging from 7.1 to 8), it may be desirable to adjust the pH of the resulting ink composition to a basic or more basic pH. Any suitable base may be added to adjust the pH, as long as the added base does not interfere with the other desirable properties of the ink composition. Some examples of suitable bases include NaOH or KOH. The amount of base added depends, at least in part, on the initial pH of the ink composition and the desired final pH of the ink composition. In an example, the pH is adjusted to be 9 or greater, and a suitable amount of base is added until this pH is obtained.

Figure 1:
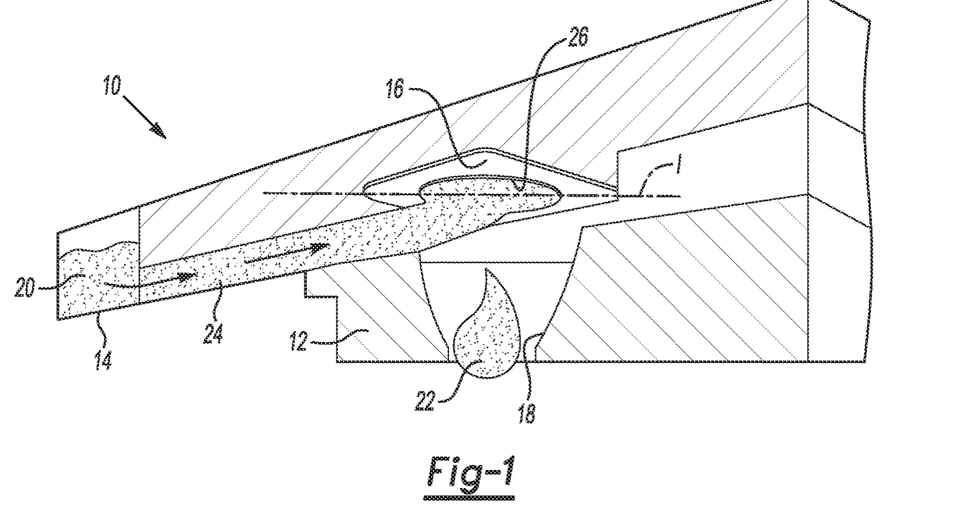
FIG. 1 is an enlarged, cutaway, cross sectional, perspective semi-schematic illustration of an example of a print cartridge including an example of the ink composition disclosed herein.

The ink composition disclosed herein may be suitable for use in any inkjet printing system, such as a thermal or piezoelectric inkjet printer. Referring now to FIG. 1, a print cartridge is generally depicted at 10. The print cartridge 10 includes a housing 12 (which may include one or more layers of different materials) that is operatively connected to a reservoir 14 that contains an example of the ink composition 20 disclosed herein. A fluid path/ink channel 24 connects the reservoir 14 to a fluid ejector 16. In a thermal inkjet print cartridge, the fluid ejector 16 is a heating element that creates heat to vaporize the ink composition 20, which creates a bubble that expands to push the ink composition 20 (in the form of drops 22) out of an orifice 26 of a nozzle 18 that is aligned with the fluid ejector 16. While a single fluid ejector 16 and nozzle 18 is shown, it is to be understood that a single print cartridge 10 may include multiple (e.g., 400 or some other desirable number) fluid ejectors 16 and nozzles 18. While not shown, it is to be understood that the print cartridge 10 includes an integrated circuit that routes signals (e.g., from a processor that is capable of running suitable computer readable instructions) to the desirable fluid ejector(s) 16 and nozzle(s) 18 for firing ink drops 22 therefrom to produce images on a desirable medium.

The print cartridge 10 is representative of a single nozzle, and it is to be understood that a single print cartridge includes many nozzles. When included in a high speed inkjet printing system including a page wide array, it is to be understood that several print cartridges 10 (i.e., dies), each of which includes at least 1,000 nozzles, are arranged together. While not shown, it is to be understood that the high speed inkjet printing system may also include an automated service station. This service station may be programmed to ensure that the print cartridge 10 is automatically capped, uncapped, and cleaned with minimal system downtime. This also contributes to enhanced print quality.

As mentioned above, examples of modified copolymer additive in the ink composition 20 form the anti-evaporative layer during uncapped non-use at an interface I between air and the ink composition 20 in the orifice 26 of the nozzle 18, thereby reducing evaporation of the water from the ink composition 20.

Figure 2:
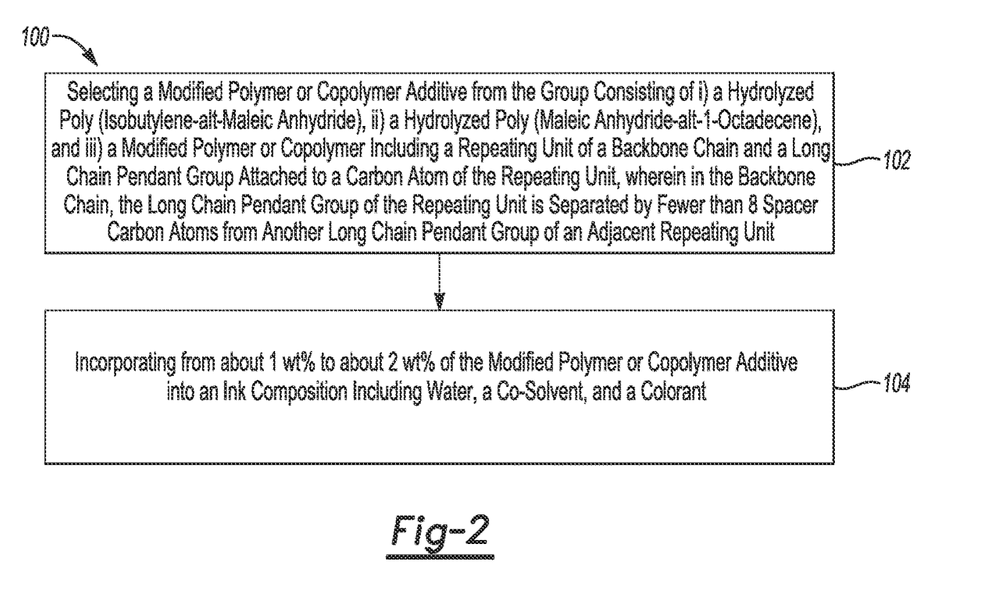
FIG. 2 is a flow diagram illustrating an example of a method for improving decap.

Referring now to FIG. 2, an example of a method for improving decap performance of the ink composition 20 according to the present disclosure is generally depicted at 100. The method 100 includes, as shown at reference numeral 102, selecting a modified polymer or copolymer additive from the group consisting of i) a hydrolyzed poly(isobutylene-alt-maleic anhydride), ii) a hydrolyzed poly(maleic anhydride-alt-1-octadecene), and iii) a modified polymer or copolymer including a repeating unit of a backbone chain and a long chain pendant group attached to a carbon atom of the repeating unit, wherein in the backbone chain, the long chain pendant group of the repeating unit is separated by fewer than 8 spacer carbon atoms from another long chain pendant group of an adjacent repeating unit. As shown at reference numeral 104, the example method 100 further includes incorporating the selected modified polymer or copolymer additive into an ink composition including water, a co-solvent, and a colorant. The modified polymer or copolymer additive may be present in an amount ranging from about 1 wt % to about 2 wt %.

To further illustrate the present disclosure, examples are given herein. It is to be understood that these examples are provided for illustrative purposes and are not to be construed as limiting the scope of the present disclosure.

Example 1

Several examples of the modified copolymer additive disclosed herein were prepared. Each of the example modified copolymer additives included a copolymer modified with a nucleophile. The example modified copolymer additives included hydrolyzed poly(isobutylene-alt-maleic anhydride), hydrolyzed poly(maleic anhydride-alt-1-octadecene), or copolymers having pendant group(s) attached to carbon atoms of the copolymer backbone that are fewer than 8 carbon atoms apart. When the pendant group of the example modified copolymer additive included poly(oxyethylene) group(s), the ratio of linear atoms in the long chain pendant group to spacer carbon atoms between equivalent chemical sites in the backbone chain was at least 25:3.

Several comparative modified copolymers were also prepared. For at least some of the comparative examples, the first and second pendant groups attached to carbon atoms of the copolymer backbone were 8 or more carbon atoms apart. For at least some other of the comparative examples, the ratio of hydrophobic and hydrophilic groups was not suitable ratio for forming the monolayer. Still further, some of the comparative modified copolymers exhibited unfavorable steric interactions. For example, with PIAM and BRIJ® IC20-70 (comparative example 1), unfavorable interactions may occur between the aliphatic chain of the pendant group (from BRIJ® IC20-70) and the geminal di-methyl groups of the PIAM. These interactions may restrict monolayer formation. Moreover, at least one of the comparative modified copolymers (comparative example 3) had a ratio of linear atoms in the long chain pendant group (which included poly(oxyethylene) groups) to spacer carbon atoms in the backbone chain of equivalent chemical sites of less than 25:3. This may prevent monolayer formation.

The hydrolyzed poly(isobutylene-alt-maleic anhydride) (Example 1) and the hydrolyzed poly(maleic anhydride-alt-1-octadecene) (Example 5) were prepared according to the following method. The modified copolymer (i.e., poly(isobutylene-alt-maleic anhydride) or poly(maleic anhydride-alt-1-octadecene)) (5 g) was added to a container of 45 wt % potassium hydroxide (KOH) (20 ml) further diluted in water (20 ml) to form a mixture. The mixture was heated to a temperature of about 100° C. for about 12 hours to form a homogenous mixture. The homogenous mixture was acidified to a pH of less than 4 by adding concentrated sulfuric acid to form a suspension. The suspension included a viscous layer of the modified copolymer additive at the bottom of the container and an aqueous portion on top of the viscous layer. The aqueous portion of the suspension was decanted from the container to isolate the modified copolymer additive which was further dried in a vacuum oven at 60° C.

For comparative example 4, SMA2000P (3 g) was added to a container of 45 wt % potassium hydroxide (KOH) (5 mL) further diluted in water (15 mL) to form a mixture. The mixture was heated to a temperature of about 100° C. for about 12 hours to form a homogeneous mixture. The homogeneous mixture was acidified to a pH of less than 4 by adding concentrated sulfuric acid to form a suspension. The hydrolysis product separated from the suspension as a viscous layer on the bottom upon standing. The aqueous portion of the suspension was decanted from the container to isolate the hydrolyzed polymer which was further dried in a vacuum oven at 60° C.

The remaining examples (Examples 2-4 and 6) and the comparative examples (Comparative Examples 1-3, 5, and 6) were prepared according to the following method. The respective copolymers shown in Table 1 and the respective nucleophiles shown in Table 1 were added to respective containers to form respective mixtures. The copolymer and nucleophile were mixed at a molar ratio of 1:1.2. The mixture was heated to a temperature of about 100° C. for about 12 hours, which was a suitable time to react the components and form the example modified copolymer additives or the comparative example modified copolymer additives. The additives were allowed to cool to room temperature.

Each component used to form the examples of the modified copolymer additive and the comparative examples are shown below in Table 1. The following abbreviations are used in Table 1: the modified copolymer additive ID number (ID #), PIAM (Poly(isobutylene-alt-maleic anhydride)), KOH (potassium hydroxide), SMA® 1000P or H (styrene maleic anhydride resin, powder form (P) or hydrolyzed version (H), with a 1:1 mole ratio made available by Cray Valley), SMA® 2000P or H (styrene maleic anhydride resin with a 2:1 mole ratio made available by Cray Valley), SMA® 3000P or H (styrene maleic anhydride resin with a 3:1 mole ratio made available by Cray Valley), BRIJ® IC20-70 (polyoxyethylene vegetable-based fatty ether (or ethoxylated natural fatty alcohol) made available by Croda Inc.), PMAO (poly(maleic anhydride-alt-1-octadecene)), BRIJ® L4-LQ (ethoxylated natural fatty alcohol made available by Croda Inc.), and JEFFAMINE® M600 polyetheramine (600 molecular weight polypropylene glycol monoamine, made available by Huntsman).

TABLE 1

| ID # | Copolymer | Nucleophile Source |
|---|---|---|
| Example 1 | PIAM | KOH |
| Example 2 | PIAM | Dodecanol |
| Example 3 | SMA® 1000P | BRIJ® IC20-70 |
| Example 4 | SMA® 1000P | BRIJ® L4-LQ |
| Example 5 | PMAO | KOH |
| Example 6 | SMA® 2000P | BRIJ® IC20-70 |
| Comparative Example 1 | PIAM | BRIJ® IC20-70 |
| Comparative Example 2 | SMA® 3000P | BRIJ® IC20-70 |
| Comparative Example 3 | SMA® 2000 | BRIJ® L4-LQ |
| Comparative Example 4 | SMA® 2000H | N/A |
| Comparative Example 5 | PIAM | JEFFAMINE® M600 |
| Comparative Example 6 | PMAO | BRIJ® IC20-70 |

Each example of the modified copolymer additive and each comparative example was added to other components to form example and comparative example ink compositions. The general ink composition is listed below in Table 2.

TABLE 2

| Ingredient Type | Components | Amount (wt %) |
|---|---|---|
| Solvent | 2-pyrrolidinone | 18.0 |
| Surfactant | SURFYNOL® 104 | 0.1 |
| Biocide | PROXEL® GXL | 0.2 |
| Additive | Example Modified copolymer additive or Comparative Example of TABLE 1 | 1.0-1.7 |
| Colorant | Dispersed carbon black pigment | 4.4 |
| Water | | Balance |
| pH adjuster | Potassium hydroxide (KOH) | >9 |

The inks and comparative inks are referred to herein according to the modified copolymer additive ID number. As such, example ink 1 includes the modified copolymer additive of example 1.

Two types of decap performance were evaluated for the different ink compositions. Standard decap ("Std") was the first type of decap measurement tested. The standard decap is the length of time that the inkjet pen can remain unused and uncapped before spitting would be required to form an acceptable quality ink drop. The inkjet pen can recover by purging the inkjet pen via spitting to obtain an acceptable quality ink drop. Obtaining an acceptable quality ink drop via spitting is another decap metric that may be used, which is known as spits on page ("Sop"). The spits on page decap test is the number of spits required to get the pen healthy at a specific time interval. The longest decap time that would give acceptable first drop quality or the fewest number of spits required at any given decap time would be desirable for any given ink. The qualitative decap test results are categorized below in Table 3 as excellent, very good, suitable, poor, and terrible depending on how each example and comparative example ink composition performed in the Std and Sop decap tests.

TABLE 3

| ID # | Std Decap | Sop Decap |
|---|---|---|
| Example Ink 1 | Excellent | Excellent |
| Example Ink 2 | Excellent | Excellent |
| Example Ink 3 | Excellent | Very good |
| Example Ink 4 | Very good | Very good |
| Example Ink 5 | Very good | Suitable |
| Example Ink 6 | Suitable | Suitable |
| Comparative Example Ink 1 | Suitable | Poor |
| Comparative Example Ink 2 | Poor | Poor |
| Comparative Example Ink 3 | Poor | Terrible |
| Comparative Example Ink 4 | Terrible | Terrible |
| Comparative Example Ink 5 | Terrible | Terrible |
| Comparative Example Ink 6 | Terrible | Terrible |

As shown in Table 3, the Std and Sop decap results were at least suitable for every example ink composition that included an example of the modified copolymer additive. Example inks 1-3 showed that the nozzle may be uncapped and idle for a time ranging from a few seconds to over 16 seconds and still recover the inkjet pen health in a range of about one spit or less.

Example 2

Several examples of the modified copolymer additive disclosed herein were prepared. Each of the example modified copolymer additives included a copolymer modified with a nucleophile. The example modified copolymer additives included hydrolyzed poly(isobutylene-alt-maleic anhydride) or copolymers having pendant group(s) attached to carbon atoms of the copolymer backbone that are fewer than 8 carbon atoms apart. The modified copolymers were prepared using similar procedures set forth in Example 1.

Each component used to form the examples of the modified copolymer additive is shown below in Table 4. The following abbreviations are used in Table 4: the modified copolymer additive ID number (ID #), PIAM (Poly(isobutylene-alt-maleic anhydride)), KOH (potassium hydroxide), SMA® 1000P (styrene maleic anhydride resin, powder form (P), with a 1:1 mole ratio made available by Cray Valley), BRIJ® IC20-70 and BRIJ® IC20 (polyoxyethylene vegetable-based fatty ethers (or ethoxylated natural fatty alcohol) made available by Croda Inc.), and BRIJ® L4-LQ (ethoxylated natural fatty alcohol made available by Croda Inc.).

TABLE 4

| ID # | Copolymer | Nucleophile Source | Additional Pendant Group |
|---|---|---|---|
| Example 7 | PIAM | KOH | None |
| Example 8 | SMA® 1000P | BRIJ® IC20 and | poly(ethylene glycol) methyl ether (MW = 750) |
| Example 9 (Batch 1) | SMA® 1000P | BRIJ® IC20-70 | None |
| Example 10 (Batch 2) | SMA® 1000P | BRIJ® IC20-70 | None |
| Example 11 (Batch 3) | SMA® 1000P | BRIJ® IC20-70 | None |
| Example 12 | SMA® 1000P | BRIJ® L4-LQ | None |

A black ink was used as a comparative example (referred to as comparative example 13). Table 5 shows the comparative example black ink composition.

TABLE 5

| Ingredient Type | Components | Amount (wt %) |
|---|---|---|
| Binder | Polyurethane | 1.7 |
| Solvent | 2-pyrrolidinone | 18.0 |
| Surfactant | SURFYNOL ® 104 | 0.1 |
| Biocide | PROXEL ® GXL | 0.2 |
| Colorant | Dispersed carbon black pigment | 4.4 |
| Water | | Balance |
| pH adjuster | Potassium hydroxide (KOH) | >9 |

Figure 3:
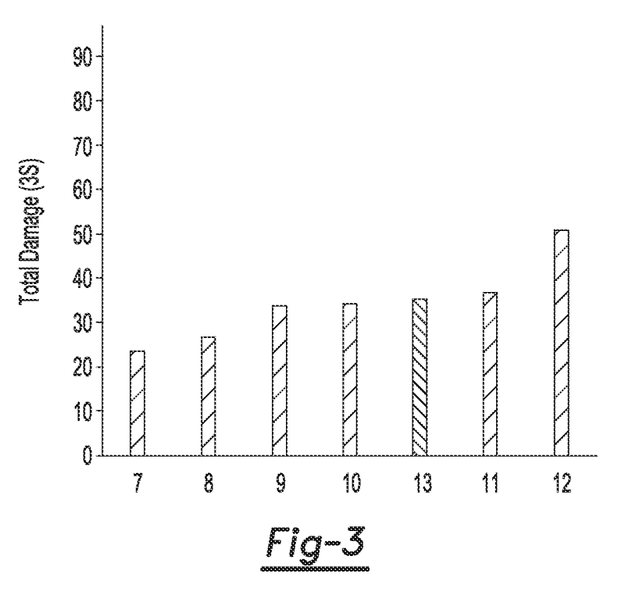
FIG. 3 is a graph illustrating machine grading total damage for several examples of the ink composition disclosed herein and a comparative example ink composition.

Example inks (7-12) were prepared by adding 1.7 wt % of the modified copolymers of Table 4 into the comparative example black ink composition. It is noted that examples 9-11 were different batches of the same type of modified copolymer. These were tested for reproducibility. All of the inks (7-13) were printed on brochure media. 3 seconds after printing, the prints were sent through the printer's duplexer. Any resulting damage to the printed surface was assessed through machine grading. These results are shown in FIG. 3. The lower the number for the machine grade, the better the durability. As illustrated in FIG. 3, example modified copolymers 7-11 exhibited comparable or better durability than the black ink without the modified copolymer additive therein (i.e. comparative ink 13). Ink 12 with modified copolymer 12 exhibited slightly worse durability than the black ink 13, but still within an acceptable level.

As discussed herein, examples of the modified polymer or copolymer additive disclosed herein may form a monolayer or thicker layer at the air-ink interface, thereby greatly reducing water evaporation. This "soft" cap at the orifice of the inkjet pen, while acting as a protective layer, is nonetheless easily jetted out by the firing event. The spacing between the pendant groups of the modified copolymer additive enables the monolayer to be formed, and the hydrophobic and hydrophilic portions maintain the monolayer at the air-water interface.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range of from about 10 wt % to about 30 wt % should be interpreted to include not only the explicitly recited limits of from about 10 wt % to about 30 wt %, but also to include individual values, such as 18.3 wt %, 22.25 wt %, 29 wt %, etc., and sub-ranges, such as from about 15 wt % to about 25 wt %, from about 12 wt % to about 20 wt %, etc.

Furthermore, when "about" or "substantially" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. An ink composition, comprising:
water;
a co-solvent;
a colorant; and
a modified polymer or copolymer additive, wherein the modified polymer or copolymer additive is a modified polymer or copolymer including:
a repeating unit of a backbone chain;
a long chain pendant group attached to a carbon atom of the repeating unit; and
an other pendant group attached directly or indirectly to an other carbon atom of the backbone chain;
wherein in the backbone chain, the long chain pendant group of the repeating unit is separated by fewer than 8 spacer carbon atoms from an other long chain pendant group of an adjacent repeating unit, and the other carbon is separated from the carbon atom by at least 7 carbon atoms.

2. The ink composition as defined in claim 1 wherein the long chain pendant group includes an ethylene oxide group, and wherein a ratio of a number of linear atoms in the long chain pendant group to spacer carbon atoms between equivalent chemical sites in the backbone chain is at least 25:3.

3. The ink composition as defined in claim 1 wherein the repeating unit is formed from a monomer or comonomer selected from the group consisting of maleic anhydride, an acrylic monomer or comonomer, a methacrylic monomer or comonomer, an amine monomer or comonomer, a vinyl alcohol monomer or comonomer, an allyl alcohol monomer or comonomer, a hydroxyethyl acrylate monomer or comonomer, a hydroxyethyl methacrylate monomer or comonomer, a styrene maleic anhydride having a 1:1 styrene:maleic anhydride ratio, a styrene maleic anhydride having a 2:1 styrene:maleic anhydride ratio, and isobutylene-alt-maleic anhydride.

4. The ink composition as defined in claim 1 wherein the long chain pendant group is formed from an aliphatic alcohol; an aliphatic amine; a thiol, a polyoxyethylene vegetable-based ether derived from lauryl, cetyl, stearyl, isostearyl, or oleyl alcohol; an ethoxylated natural fatty alcohol; an acid chloride; adipic acid ethyl ester; elaidic acid ethyl ester; or R'(CH$_2$)$_y$COY where R' is CH$_3$ or COOH, y ranges from 8 to 16, and Y is OCH$_3$, OCH$_2$CH$_3$, or Cl.

5. The ink composition as defined in claim 1 wherein the long chain pendant group includes an oxygen atom or a nitrogen atom that is attached to the carbon atom of the repeating backbone chain through an other carbon atom.

6. An ink composition, comprising:
water;
a co-solvent;
a colorant; and
a modified polymer or copolymer additive, wherein the modified polymer or copolymer additive is a modified polymer or copolymer including:
a repeating unit of a backbone chain; and
a long chain pendant group attached to a carbon atom of the repeating unit;
wherein in the backbone chain, the long chain pendant group of the repeating unit is separated by fewer than 8 spacer carbon atoms from an other long chain pendant group of an adjacent repeating unit;
the repeating unit is formed from a comonomer selected from the group consisting of:
a comonomer of styrene and acrylic acid;
a comonomer of styrene and methacrylic acid;

vinyl alcohol-co-ethylene;
styrene-co-allyl alcohol;
linear ethyleneimine; and
a branched ethyleneimine having any of primary or secondary amines.

7. The ink composition as defined in claim 6 wherein the long chain pendant group of the repeating unit is separated by fewer than 6 spacer carbon atoms from the other long chain pendant group of the adjacent repeating unit.

8. A print cartridge, comprising:
a fluid reservoir;
a fluid ejector in fluid communication with the fluid reservoir;
a nozzle in fluid communication with the fluid ejector;
an ink composition present in the fluid reservoir, the ink composition including:
water;
a co-solvent;
a colorant; and
a modified polymer or copolymer additive, wherein the modified polymer or copolymer additive is a modified polymer or copolymer including:
a repeating unit of a backbone chain, wherein the repeating unit is formed from a monomer or comonomer selected from the group consisting of: maleic anhydride, an acrylic monomer or comonomer, a methacrylic monomer or comonomer, an amine monomer or comonomer, a vinyl alcohol monomer or comonomer, an allyl alcohol monomer or comonomer, a hydroxyethyl acrylate monomer or comonomer, a hydroxyethyl methacrylate monomer or comonomer, a styrene maleic anhydride having a 1:1 styrene:maleic anhydride ratio, a styrene maleic anhydride having a 2:1 styrene:maleic anhydride ratio, and isobutylene-alt-maleic anhydride; and
a long chain pendant group attached to a carbon atom of the repeating unit;
wherein in the backbone chain, the long chain pendant group of the repeating unit is separated by fewer than 8 spacer carbon atoms from an other long chain pendant group of an adjacent repeating unit.

9. The print cartridge as defined in claim 8 wherein the long chain pendant group includes an ethylene oxide group, and wherein a ratio of a number of linear atoms in the long chain pendant group to spacer carbon atoms between equivalent chemical sites in the backbone chain is at least 25:3.

10. The print cartridge as defined in claim 8 wherein the long chain pendant group is formed from an aliphatic alcohol; an aliphatic amine; a thiol, a polyoxyethylene vegetable-based ether derived from lauryl, cetyl, stearyl, isostearyl or oleyl alcohol; an ethoxylated natural fatty alcohol; an acid chloride; adipic acid ethyl ester; elaidic acid ethyl ester; or $R'(CH_2)_yCOY$ where $R'$ is $CH_3$ or COOH, y ranges from 8 to 16, and Y is $OCH_3$, $OCH_2CH_3$, or Cl.

11. A method for improving decap, the method comprising:
selecting a modified polymer or copolymer additive from the group consisting of a hydrolyzed poly(maleic anhydride-alt-1-octadecene), and a modified polymer or copolymer including:
a repeating unit of a backbone chain, wherein the repeating unit is a comonomer selected from the group consisting of:
a comonomer of styrene and acrylic acid;
a comonomer of styrene and methacrylic acid;
vinyl alcohol-co-ethylene;
styrene-co-allyl alcohol;
linear ethyleneimine; and
a branched ethyleneimine having any of primary or secondary amines; and
a long chain pendant group attached to a carbon atom of the repeating unit;
wherein in the backbone chain, the long chain pendant group of the repeating unit is separated by fewer than 8 spacer carbon atoms from an other long chain pendant group of an adjacent repeating unit; and
incorporating from about 1 wt % to about 2 wt % of the modified polymer or copolymer additive into an ink composition including water, a co-solvent, and a colorant.

12. The method as defined in claim 11 wherein the selected modified polymer or copolymer additive is the modified polymer or copolymer, and wherein prior to selecting the modified polymer or copolymer additive, the method further comprises:
derivatizing the monomer or comonomer with the long chain pendant group; and
polymerizing the monomer or comonomer to form the modified polymer or copolymer.

13. An ink composition, comprising:
water;
a co-solvent;
a colorant; and
a modified polymer or copolymer additive, wherein the modified polymer or copolymer additive is the hydrolyzed poly(maleic anhydride-alt-1-octadecene).

* * * * *